United States Patent [19]

Tyler et al.

[11] 4,297,557
[45] Oct. 27, 1981

[54] MICROWAVE OVEN TEMPERATURE INDICATOR AND CONTROL MEANS

[75] Inventors: Hugh J. Tyler, Santa Ana; William H. Conway, Hacienda Heights, both of Calif.

[73] Assignee: Robertshaw Controls Company, Richmond, Va.

[21] Appl. No.: 682,198

[22] Filed: May 3, 1976

[51] Int. Cl.³ .............................................. H05B 6/68
[52] U.S. Cl. ........................ 219/10.55 R; 99/329 R; 219/10.55 E; 219/10.55 B; 331/66; 340/870.18; 340/870.39
[58] Field of Search ................. 219/10.55 R, 10.55 E, 219/10.55 M, 450, 494, 506, 10.55 B; 340/207 R, 210, 224, 417, 227 R, 228 R; 99/326, 329 R, 342; 331/66; 325/37, 185, 494; 73/345

[56] References Cited

U.S. PATENT DOCUMENTS

| | | | |
|---|---|---|---|
| 2,813,242 | 11/1957 | Crump | 325/185 |
| 3,253,588 | 5/1966 | Vuilleumier et al. | 325/185 |
| 3,333,476 | 8/1967 | Hardy et al. | 219/494 |
| 3,355,949 | 12/1967 | Elwood et al. | 73/345 |
| 3,434,678 | 3/1969 | Brown et al. | 325/494 |
| 3,582,921 | 6/1971 | Krieger | 340/228 R |
| 3,651,405 | 3/1972 | Whitney et al. | 99/342 |
| 3,872,728 | 3/1975 | Joyce et al. | 331/66 |
| 3,988,929 | 11/1976 | White et al. | 219/10.55 R |
| 4,001,798 | 1/1977 | Robinson | 340/210 |

*Primary Examiner*—C. C. Shaw
*Attorney, Agent, or Firm*—Fulwider, Patton, Rieber, Lee & Utecht

[57] ABSTRACT

There is disclosed a telemetric temperature probe for telemetry of temperatures of comestibles which are heated within microwave ovens. The probe includes a temperature responsive circuit for generating a signal responsive to the temperature of the comestible and an electromagnetic wave broadcasting circuit for telemetric transmission of the signal to a remote receiver which can conveniently be incorporated in the microwave oven and coupled to its control circuit. The probe is provided with facilities to derive power necessary for its operation from the microwave energy generated by the oven and includes, for this purpose, an antenna to receive microwave energy, a rectifier circuit for developing direct current power therefrom and a voltage regulation circuit to produce a source of direct current of controlled voltage for operation of the temperature responsive circuit and the broadcasting circuit.

6 Claims, 6 Drawing Figures

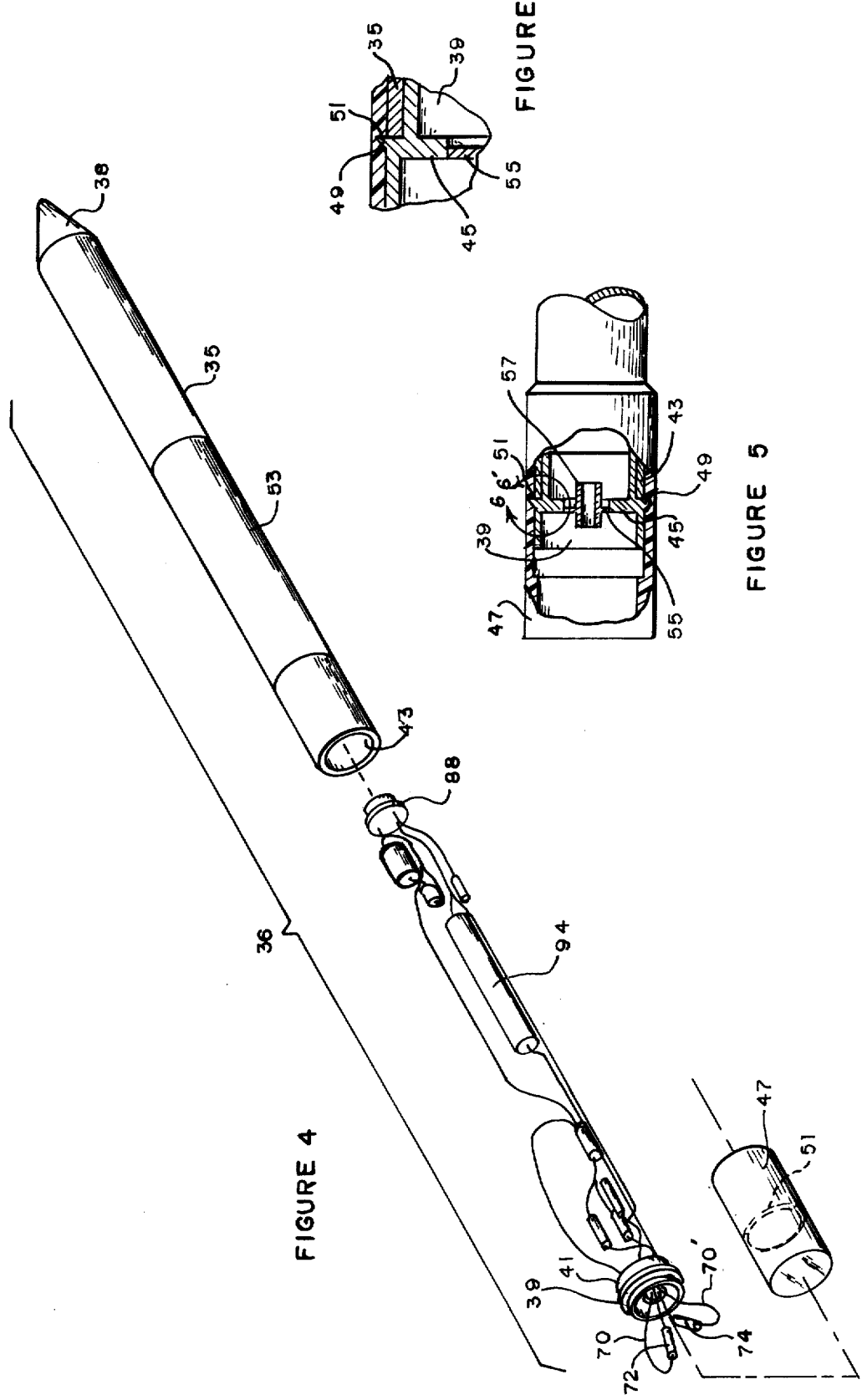

MICROWAVE OVEN TEMPERATURE INDICATOR AND CONTROL MEANS

BACKGROUND OF THE INVENTION

1. Field of the Invention

This invention relates to a telemetric temperature device and, in particular, to a telemetric temperature probe for microwave processing, typically microwave cooking.

2. Description of the Prior Art

Microwave ovens are home appliances of increasing popularity and sales. The advantages offered by the microwave ovens include compactness and high thermal efficiencies and speed in cooking. The temperature of comestibles heated in the microwave ovens has not, heretofore, been precisely controlled because of a lack of precision in detection of temperatures of comestibles within microwave ovens. Temperature control is particularly difficult with small size comestibles since the highly efficient microwave oven heats small comestibles so rapidly that ordinary timed control of the heating process fails to provide reliable temperature control.

A number of attempts have been made to provide direct measurement of temperatures of comestibles within a microwave oven. Included in these attempts have been positioning of microwave absorbent material in an internal fixture of the oven and measuring the temperature of this material, thereby deriving a signal which is proportional to the total energy input to the oven. The difficulty with this approach is that the temperature reached by a comestible placed within the oven depends on its mass and condition and only a direct temperature measurement of the comestible is, therefore, reliable.

Another attempt has been made to provide a thermometer which can be inserted into the comestible. The thermometer is provided with a non-ionic temperature responsive fluid to avoid its interaction with the microwave energy. While this device can be used as a thermometer, it does not provide for automatic control of the microwave oven in response to the sensed temperatures.

Another attempt has been made in which a temperature responsive circuit is positioned within a probe which is coupled through an umbilical cord to the oven control circuit. The umbilical cord provides the power supply to the temperature responsive circuit and transmits the temperature responsive signal to the oven control circuit. This device is somewhat cumbersome, requiring that the probe be inserted and removed from the comestible or disconnected from the oven whenever the comestible is to be placed in or removed from the oven.

SUMMARY OF THE INVENTION

This invention comprises a telemetric temperature probe which can be placed within a comestible to be processed in a microwave oven. The telemetric probe includes power supply means comprising microwave receiver circuit means which includes a microwave receiving antenna, and power control circuit means in circuit therewith to provide a direct current of controlled voltage suitable for driving the telemetric probe circuits. The telemetric probe circuits include a temperature responsive circuit that develops a signal which is responsive to the sensed temperature of the comestible and a low frequency electromagnetic wave transmission circuit to broadcast the temperature responsive signal.

The microwave oven is provided with receiver means including an antenna for receiving the low frequency broadcast temperature responsive signal and logic circuitry for processing of the received signal, preferably by digital techniques, to provide an output signal that can be displayed in a conventional digital readout or that can be used as an input signal to a digital microprocessor for control of the microwave oven operation.

BRIEF DESCRIPTION OF THE DRAWINGS

The invention will be described by reference to the figures of which:

FIG. 4 illustrates the assembly of the components in a probe housing; and

FIG. 5 is a partial sectional view of the closure end member on the probe housing.

FIG. 6 is a detailed view of section 6—6' in FIG. 5.

DESCRIPTION OF THE ILLUSTRATED EMBODIMENTS

Figure 1:
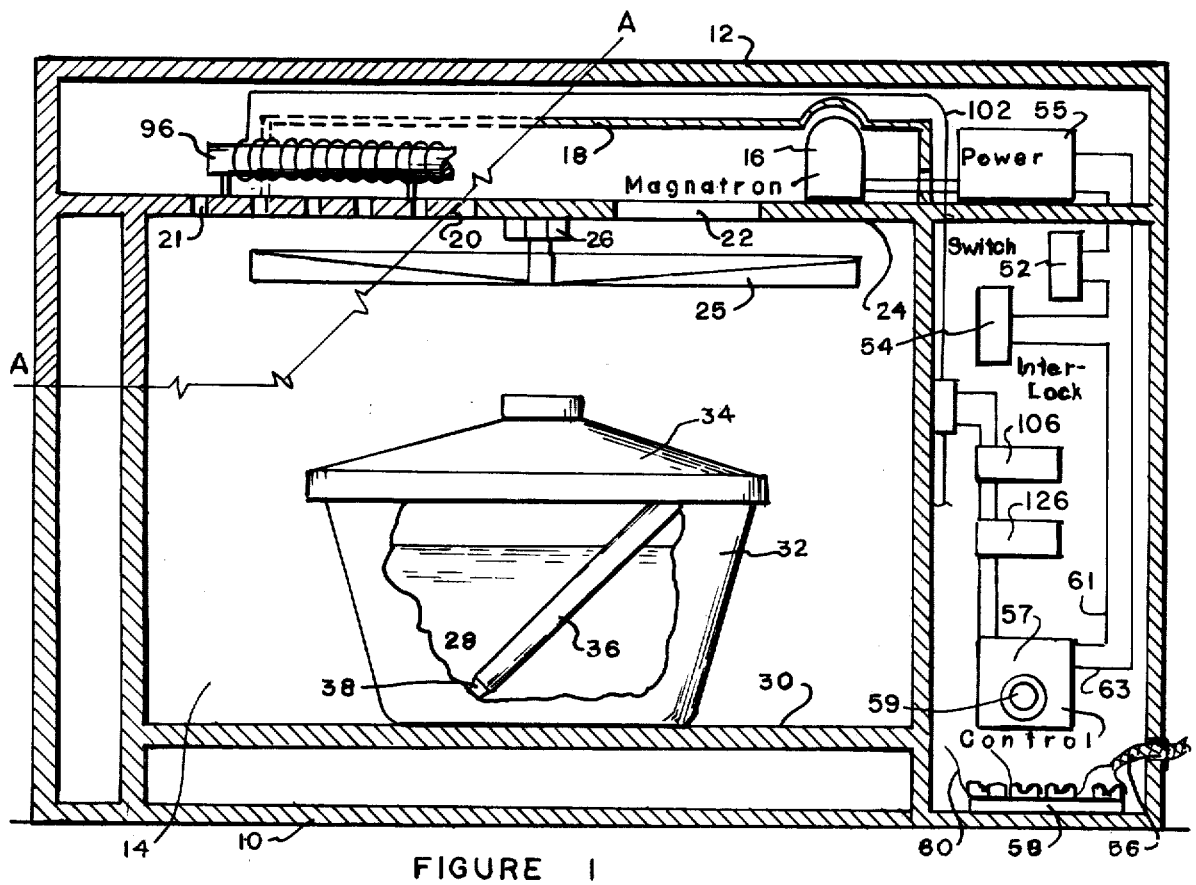
FIG. 1 illustrates the temperature probe in a microwave oven along a partial sectional view through the microwave cavity.

Referring now to FIG. 1, the microwave oven 10 is shown with an outer housing 12 and internal walls to define an oven compartment 14. Typically, the magnatron tube 16 for generating the microwaves is located at the top of the oven, discharging towards wave guide 18 which is formed of microwave reflecting material such as metal, e.g., aluminum, brass, etc., which can have a reflective gold coating.

The wave guide 18 is positioned to reflect the microwaves through the open areas 20 and 22 in the roof 24 of the oven cavity 14. A microwave stirring means in the form of a fan 25 is provided in the upper portion of the oven cavity 14 and is slowly rotated by prime mover 26. This stirring means deflects the transmission path of the microwaves passing through apertures 20 and 22 and thereby provides a uniform diffusion of the microwave energy transmitted onto the oven cavity 14.

The comestible to be processed, e.g., solid materials such as meat and the like or liquids such as soup and the like, is positioned with the oven cavity 14, typically resting on the bottom floor 30 of the cavity or on a shelf supported within the oven cavity. Comestible 28 is contained within a cooking utensil 32 having a cover 34, both non-metallic. non-metallic cover 34. The telemetric temperature probe 36 of the invention is placed at a depth within the comestible 28 sufficient to insure that its temperature sensing portion, e.g., its tip 38, is in heat exchange relationship with the interior of the comestible 28.

The microwave oven 10 includes, in its structure, electromagnetic wave energy receiving means such as the ferrite antenna 96 which is illustrated as mounted near the ventilation apertures 21 of the oven. As shown by partial sectional view A—A, the roof 24 bears apertures 21 forward of the wave guide 18. This location shields antenna 40 from the microwave energy, yet insures adequate detection sensitivity of the antenna.

The microwave oven also includes the conventional facilities such as the on-off switch 52, a door innerlock switch 54 and the transformer and power supply components mounted in housing 55. The antenna 96 is connected by shielded cable 102 to an amplifier 106. The output of the amplifier 106 is connected to a phase locked loop oscillator 126. The output of oscillator 126 is coupled to digital signal processing means within control box 57 which can include a microprocessor as well as a light emitting diode display device having a temperature setting knob 59. The output leads 61 and 63 of control box are connected to the magnetion transformer and power supply 55 through the switches 52 and 54. The power supply cord 56 is connected to terminal block 58 provided with leads such as 60 that extend to auxiliary equipment such as fans, infrared heater and the like.

Figure 2:
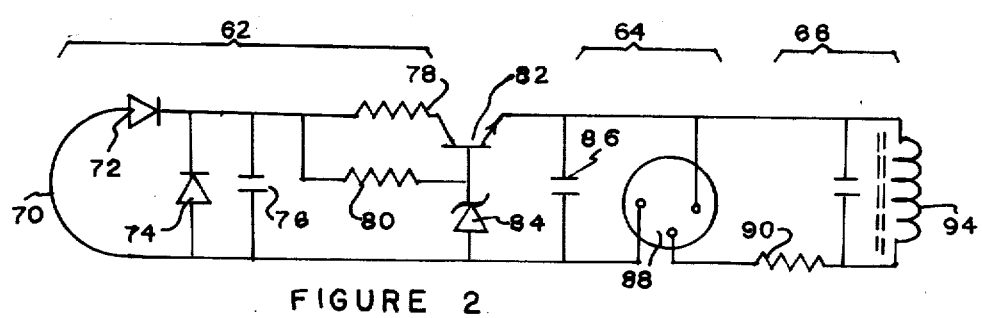
FIGS. 2 and 2A are electrical schematics of operative circuits for the telemetric temperature probe.

Referring now to FIG. 2, the electrical schematic of a suitable circuit for the telemetric temperature probe is illustrated. This circuit includes a power supply circuit means 62, temperature responsive circuit means 64 and signal broadcasting circuit means 66. These circuit means are contained within the housing of the telemetric temperature probe 36 in FIG. 1.

The power supply circuit means 62 includes microwave receiver facilities such as loop antenna 70, rectifier circuit means such as diode 72 in circuit with antenna loop 70 and diode 74 in parallel circuit thereto to derive a half wave, direct current, input voltage across capacitor 76.

Due to the variable nature of the microwave energy received by the loop antenna 70, a voltage regulator is utilized to provide substantially constant voltage to the temperature responsive circuit within block 64. The voltage regulator includes resistors 78 and 80 together with transsistor 82 and Zener diode 84 connected in a conventional series voltage regulator configuration which provides a substantially constant D.C. voltage across filter capacitor 86. The generated supply voltage across capacitor 86 powers a commercially available integrated circuit crystal oscillator 88 which provides an oscillator output through a resistor 90 to a tuned circuit including a capacitor 92 and a ferrite core inductor 94 which also serves as the telemetering transmitting antenna. The integrated circuit crystal oscillator 88 utilized in the illustrated embodiment is a commercial unit which has oscillator and amplifier circuits, No. SQXO-2, available from Statek Corporation, 1200 Alvarez Ave., Orange, California 92668.

The basic oscillator frequency is approximately 32,768 Hertz when operated under normal ambient conditions. It should be appreciated that the crystal oscillator is utilized as the temperature sensing device and thus its frequency is variable with temperature as will be described in detail below. The frequency which is broadcast by the inductor antenna 94 is in the very-low to low frequency range. We have found that this frequency range, e.g., from 10,000 to about 50,000 Hertz, preferably from 25,000 to about 40,000 Hertz, readily penetrates the shielding of the oven which blocks microwave transmission from the oven cavity. Despite the relatively low frequency of the broadcast signal, a sufficiently strong signal can be broadcast with a very compact antenna, thereby providing a very small probe unit. The broadcast, very low to low frequency signal will propagate throughout the oven compartment 14 and through the microwave shielding within the oven to a receiving antenna as described below.

Figure 3:
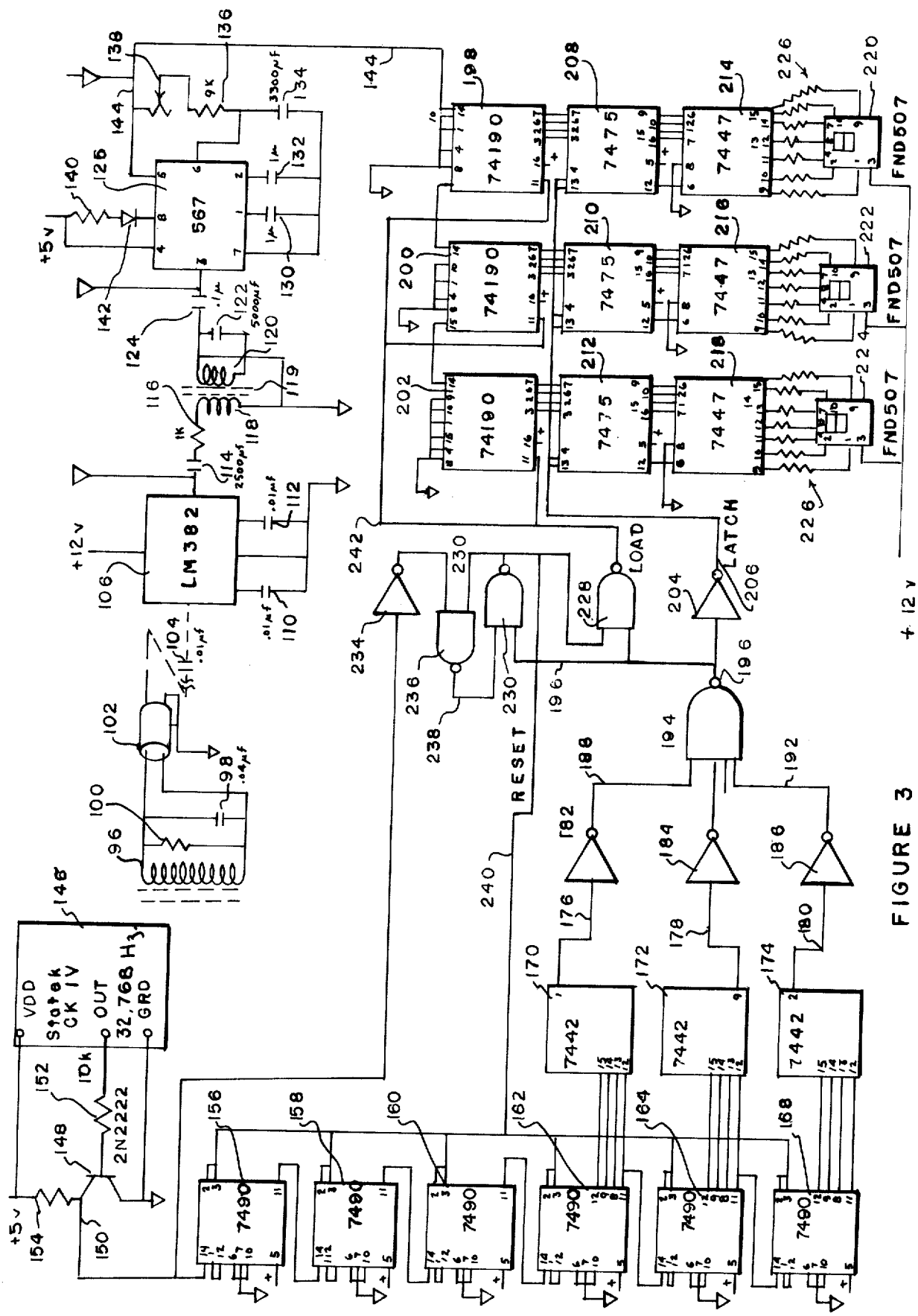
FIG. 3 is a schematic of the microwave oven receiver circuit and the data processing facilities.

The telemetering receiver used in illustrated temperature indicating system of the invention is shown in FIG. 3. The very low frequency radio oscillations from the temperature probe transmitter are received by a ferrite loop antenna coil 96 which forms a tuned circuit pick up together with capacitor 98 and damping resistor 100. The received very-low to low frequency energy is transmitted through a shielded cable 102 through capacitor 104 to the input to an integrated circuit audio amplifier 106. The illustrated audio amplifier includes feedback capacitors 110 and 112 conventionally connected to the amplifier 106. The amplifier 106 is available as part #LM382 from National Semi-Conductor Corporation, Santa Clara, California.

The output of audio amplifier 106 is connected through series capacitor 114 and resistor 116 to the primary winding 118 of a conventional and commercially available intermediate frequency transformer 119, 19 kHz transformer from J. W. Miller, Division of Bell Industries, 19070 Reyes Ave., Compton, California.

The secondary 120 of the transformer 119 forms part of a tuned circuit with capacitor 112 connected through capacitor 124 to the input of a phase locked loop oscillator 126. The phase locked loop oscillator 126 is commercially available as #567 from Signetics Corporation, 811 E. Arques Avenue, Sunnyvale, California.

The phase locked loop oscillator 126 is conventionally compensated by means of capacitors 130 and 132 and timing compensator capacitor 134, resistor 136 and potentiometer 138. The power supply is connected through resistor 140 and light emitting diode (LED) 142 to the load terminal. The clock output of line 144 is substantially a square wave pulse signal corresponding to the oscillator frequency of the probe and serves as the input to the digital circuitry which provides a digital readout of the probe temperature.

When utilizing the integrated circuit crystal oscillator 88 in the probe configuration described above, it has been determined that the temperature variable oscillator output changes only one Hertz for every six degrees Fahrenheit change in temperature. Therefore, to detect a change in temperature of one degree Fahrenheit, a sample time equal to approximately six times the number of basic oscillator pulses is required so that the total number of pulses changes by one over the sample time for each degree of temperature change.

To this end, a temperature stable reference oscillator 146 is provided which feeds a driving transistor 148 to provide pulses on line 150 at the same basic rate as those generated by the oscillator 88 within the probe. The reference oscillator is a conventionally available Model CK-IV from Statek Corp., 1200 Alvarez Avenue, Orange, California 92668. Transistor 148 has a base limiting resistor 152 and a collector resistor 154 in a conventional switch configuration. The reference oscillator 146 provides pulses on line 150 of a nominal 32,768 Hertz which are applied to the input of a string of series-connected decade counters 156 through 168. The decade counters 156–168 are conventional units in the 54/74 Series of transistor-transistor logic devices available from numerous manufacturers.

The decade counters 156 through 168 count pulses from the reference oscillator 146 until a preset number appears in the three most significant digit positions of the sample count. As noted above, the number of pulses which are counted is approximately six times the basic oscillator frequency and, in the illustrated embodiment, the predetermined number is 170,000 which is detected by three BCD-to-decimal decoders 170, 172, and 174 connected to the outputs of the decade counters 162, 164 and 168 containing the three most significant digits of the sample count. The BCD-to-decimal decoders are also devices in the 54/74 Series and readily available.

When the count of 170,000 is decoded, appropriate signals on lines 176, 178 and 180 are connected through inverters 182, 184, and 186, the outputs of which, on lines 188, 190 and 192, are connected as inputs to a NAND gate 194 which generates a sample complete signal on an output line 196.

While the reference oscillator pulses are being counted by the series of decade counters 156-168, the probe output pulses on line 144 are being fed to three series-connected up-down decade counters 198, 200 and 202. The decade counters 198, 200 and 202 are also available as part of the 54/74 Series. It should be appreciated that the up-down decade counters 198, 200 and 202 will contain only the three least significant digits of the probe frequency, and any number in those decade counters at the completion of the sample time represents a difference in frequency between the probe oscillator and the reference oscillator. As it is desired that the count in the decade counters 198, 200 and 202 at the completion of the sample time represents an actual temperature, a calibration number is preset into the decade counters prior to the beginning of the sample time. Thus, by properly presetting the decade counters, at the termination of the sample time, the number remaining in the decade counters 198, 200 and 202 will be a number indicating actual probe temperature.

In order to display the number in the decade counters 198, 200 and 202, at the completion of the sample time, the sample complete signal on line 196 is fed through an inverter 204 to generate a latch signal on line 206 which is applied to the load inputs of a series of four-bit latches 208, 210 and 212, also from the 54/74 Series, which hold the final number in the decade counters 198, 200 and 202 at the completion of the sample time. The output of the latches 208, 210 and 212 is connected to a series of seven-segment light emitting diode display drivers 214, 216 and 218 which in turn drive three light emitting diode display devices 220, 222 and 224, conventionally connected to the drivers through resistors 226. The light emitting diode display devices are conventional units available as part #FND507 from Fairchild Camera & Instrument Corp., Syosset, N.Y.

When the number in the decade counters 198, 200 and 202 has been transferred to the latches 208, 210 and 212 by means of the latch signal on line 206, the decade counters must then be reset to the predetermined calibration number for the next sample time and the sample time counters 156-168 must also be reset. This is effected by connecting the sample complete signal on line 196 to one of the inputs of each of a pair of NAND gates 228 and 230. The NAND gate 230 is enabled by one of the pulses from the reference oscillator on line 232 which is fed through an inverter 234 to a NAND gate 236 which supplies an enabling input on line 238 to the NAND gate 230 which then generates a reset pulse on line 240 connected to the decade counters 156-168. The reset pulse on line 240 also enables the NAND gate 228 which then generates a load signal on line 242 which causes the predetermined calibration number to be loaded into the up-down decade counters 198, 200 and 202. The next sample time is then evaluated.

Referring to FIG. 4, the temperature probe 36 is shown in partial assembly. The housing 35 is a generally tubular member of a non-magnetic corrosion resistant metal such as stainless steel with a pointed tip 38 to facilitate insertion into a comestible.

The electronic components can be assembled in a generally linear array for mounting within the tubular housing 35. The temperature responsive crystal oscillator 88 is located at a forward position to be carried in the tip 38 of housing 35, preferably in direct contact therewith, thereby insuring that it will be in a heat exchange position to a comestible receiving the probe 36. The electronic components are secured within tubular housing 35 by collar 39 which has a sleeve 41 that is pressed into the open end 43 of housing 35.

The metal walls of housing 35 provide shielding that limits transmission of the microwaves, thereby isolating the electronic components from the microwave energy. If desired the transmission of the broadcast very low to low frequency temperature modulated signal from ferrite core inductor 94 can be enhanced by reducing the thickness of the wall of housing 35 in region 53 surrounding inductor 94. Alternatively, apertures could be provided in the wall of region 53 and these apertures could be filled or covered with a plastic film for hermetically sealing housing 35. As shown in FIG. 5, the collar 39 has an annular flange 45 which provides a mounting for metal disc 55 which centrally bears a ceramic bushing 57. The bushing 57 has inner and outer metal coatings and is connected in the circuit to provide capacitor 76 shown in FIG. 2. The bushing also provides for passage of wire leads that extend to microwave receiving antennas 70 and 70' (shown in FIG. 4) which are preferably oriented at right angles for maximum reception of microwave energy. Diodes 72 and 74 can also be located outside of housing 35.

The housing is closed with end cap 47 which can be of non-metallic construction, e.g., formed of Teflon, for maximum reception of microwave energy. The cap 47 fits over collar 39 and seals the interior of housing 35.

FIG. 5 also illustrates the assembly with collar 39 pressed into end 43 of housing 35 and surrounded by cap 47. The collar 39 has an annular lip 49 and cap 47 bears an annular groove 51 cooperative therewith to lock the cap to the collar. Preferably lip 47 is bevelled, as shown, to facilitate seating of cap 47 over collar 39.

Figure 2A:
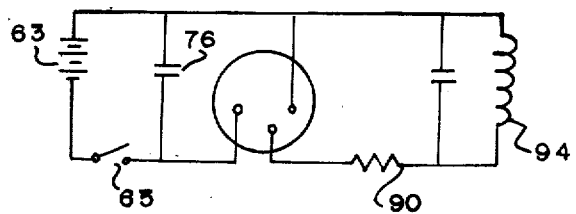

While the telemetric temperature probe of the invention has been described with application to a microwave oven, it can also be employed for other applications as shown in FIG. 2A. The illustrated power supply could also be substituted with a battery 63. This embodiment could be used in convection and radiant heated ovens as well as in microwave ovens. In such modification, the battery 63, which could be a rechargeable ore replaceable battery, can be positioned within the housing of the probe. The comestible can thus serve as a heat sink and protect any delicate circuit components that would be adversely affected by high radiant or convection temperatures, such as batteries having a limited maximum service temperature.

When a battery 63 is used, a switch 65 can be used in the circuit to avoid a constant drain on the battery. The switch 65 can be a manually actuated switch or can be a tilt switch such as a mercury switch that closes when the probe is in a preselected position, e.g., in a vertical or inclined position. The switch could also be a switch which closes when it is placed in the energy field of the oven, i.e., a switch responsive to microwave radiation or temperature responsive, such as a bimetallic switch which closes when heated.

The invention has been described with reference to the illustrated, presently preferred embodiment. It is not intended that the invention be unduly limited by this illustration. Instead, the invention is intended to be defined by the means and equivalents thereof set forth in the following claims.

What is claimed is:

1. The combination of a microwave oven and telemetric temperature probe therefor which comprises:
   (a) a microwave oven housing having internal walls defining and providing microwave shielding about an oven cavity;
   (b) a telemetric temperature probe including:
   ($b_1$) microwave antenna means and power supply circuit means in circuit therewith to generate a power supply from received microwave radiation;
   ($b_2$) temperature responsive oscillator circuit mean driven by said power supply means to generate an oscillatory signal temperature modulated frequency and of a frequency distinct from said microwave frequency;
   ($b_3$) electromagnetic wave transmission means to broadcast said oscillatory signal; and
   ($b_4$) a probe housing having shielding means surrounding said power supply circuit means, oscillator circuit means and wave transmission means and of selective permeability to limit transmission of microwave energy while permitting transmission of said broadcast oscillatory signal;
   (c) signal receiver means mounted in said oven to receive said broadcast oscillatory signal; and
   (d) shielding means, of selective permeability to limit transmission of microwave energy while permitting transmission of said broadcast oscillatory signal, in said oven and surrounding said signal receiver means.

2. The combination of claim 1 including signal processing means connected to visual temperature display means.

3. A telemetric temperature probe for positioning within a microwave oven having a cavity surrounded by microwave shielding which comprises:
   (a) power supply means;
   (b) a tubular housing having a small diameter pointed tip with a portion defined by microwave-shielding walls for positioning said probe within a comestible placed in said oven and containing the following inside said portion:
   ($b_1$) oscillator circuit means to generate an oscillatory signal having a frequency from 10,000 to about 50,000 Hertz;
   ($b_2$) electromagnetic wave transmission means including broadcast antenna means in circuit with said oscillator circuit means to broadcast said signal; and
   (c) temperature sensitive means contained in said tip of said housing and connected to said oscillator circuit means to modulate the frequency of said oscillatory signal in response to the temperature of said comestible.

4. The probe of claim 3 including, within said housing, power supply means comprising:
   (a) microwave receiver circuit means supported outside said portion of said housing; and
   (b) power control circuit means in circuit with said receiver circuit means to provide a D.C. power of regulated voltage from received microwave energy.

5. The probe of claim 4 wherein said microwave receiver means is a loop antenna.

6. The probe of claim 4 wherein said power control circuit means includes rectifier circuit means to develop a D.C. power supply from received microwave energy and a voltage regulation means to maintain a constant predetermined voltage of said D.C. power supply.

* * * * *